United States Patent
Kelley et al.

(10) Patent No.: US 7,765,258 B2
(45) Date of Patent: Jul. 27, 2010

(54) PRESENTATION NAVIGATION OVER TELEPHONE INFRASTRUCTURE

(75) Inventors: Edward E. Kelley, Wappingers Falls, NY (US); Tijs I. Wilbrink, EN Leiden (NL)

(73) Assignee: International Business Machines Corporation, Armonk, NY (US)

( * ) Notice: Subject to any disclaimer, the term of this patent is extended or adjusted under 35 U.S.C. 154(b) by 1257 days.

(21) Appl. No.: 11/306,124

(22) Filed: Dec. 16, 2005

(65) Prior Publication Data

US 2007/0143400 A1    Jun. 21, 2007

(51) Int. Cl.
G06F 15/16 (2006.01)
(52) U.S. Cl. ...................................................... 709/204
(58) Field of Classification Search .................. 709/205, 709/204, 248
See application file for complete search history.

(56) References Cited

U.S. PATENT DOCUMENTS

| | | | |
|---|---|---|---|
| 7,120,871 B1 * | 10/2006 | Harrington | 715/205 |
| 2002/0138590 A1 * | 9/2002 | Beams et al. | 709/218 |
| 2003/0033417 A1 * | 2/2003 | Zou et al. | 709/230 |
| 2003/0061286 A1 * | 3/2003 | Lin | 709/205 |
| 2005/0030255 A1 | 2/2005 | Chiu et al. | |
| 2005/0036509 A1 * | 2/2005 | Acharya et al. | 370/466 |
| 2005/0062844 A1 * | 3/2005 | Ferren et al. | 348/14.08 |
| 2005/0172232 A1 * | 8/2005 | Wiseman | 715/718 |

* cited by examiner

*Primary Examiner*—Wing F Chan
*Assistant Examiner*—Andrew Woo
(74) *Attorney, Agent, or Firm*—Whitham, Curtis, Christofferson & Cook, P.C.; Ronald A. Kaschak

(57) ABSTRACT

During a presentation conducted between a presentation computer and a user/participant computer, synchronization of displayed pages on the presentation computer and a user/participant computer is achieved consistent with allowing the user/participant to browse the presentation pages by storing a page identifier responsive to each page change at the presentation computer and, at each such page change, sending a "go to [page number]" command to the user/participant computer to display the current page, after which browsing may be resumed, if desired. Automatic selection between available communication links including links provided through telephone handsets or other telephone infrastructure including wireless links and wireless integration with presentation and/or user/participant computers for communicating the "go to [page number]" command is also provided.

10 Claims, 3 Drawing Sheets

PRESENTATION NAVIGATION OVER TELEPHONE INFRASTRUCTURE

CROSS-REFERENCE TO RELATED APPLICATIONS

This application is related to U.S. patent application Ser. No. 11/306,122, and U.S. patent application Ser. No. 11/306,123, the respective inventions of both of which are assigned to the assignee of the present invention, filed concurrently herewith and fully incorporated by reference.

BACKGROUND OF THE INVENTION

1. Field of the Invention

The present invention generally relates to virtual meetings including presentations provided over a computer network and, more particularly, to the synchronization of display of visual images used in such presentations at terminals connected to the network.

2. Description of the Prior Art

In the past, meetings have been considered to be essential for business and educational purposes and the like where presentations are often made to convey information graphically to participants for supplementing an oral discussion being conducted by a presenter. Currently, to accommodate a potentially wide geographic distribution of desired participants and a greatly increased number and frequency of such meetings, communication arrangements (e.g. IBM's e-meeting tool) for supporting virtual meetings have been developed and range for telephone conference calls where an arbitrary but usually relatively small number of participants essentially share a voice line to complex presentations including visual materials to be presented using PowerPoint™ systems or the like for broadcast over a digital data network to a large number of individuals.

In the latter type of virtual meetings, it is desirable to allow the user/participant to exercise as great a degree of freedom as possible in viewing the visual materials although such a facility is not provided by all e-meeting tools. For example, while the visual materials will generally be arranged in a linear and non-branching sequence of images (referred to hereinafter as foils, frames or, more commonly, pages), each having an identifier such as one of a sequence of numbers, letters or the like associated therewith, which can be traversed by the presenter either incrementally in a forward or backward direction or by directly proceeding (sometimes referred to as a "jump") to a particular foil or frame by a "go to" command, the users may wish to review or take notes (generally using a different application, requiring the user to shift back and forth between that application and the e-meeting tool) in regard to a particular foil/frame other than the one being discussed by the presenter and facilities supporting such user activities are provided in some, but not all, e-meeting systems.

However, where such facilities are provided, they often lead to confusion of the user in following the presentation when the presenter changes the current page while the user is viewing a different page. That is, while it would be a simple matter to track a departure of a user from a current page being discussed by a presenter and reverse the sequence to return to the page being presented at the time of the departure from the presenter's sequence, tracking the presenter's changes after the departure is much more complicated and the user generally has no frame of reference for navigating to a current page manually and ascertaining that it is the presenter's current page (thus presenting a severe distraction from the presentation in order to attempt to do so). Further, the presentation of a new page may cause the user to seek to pre-empt review of note-taking in regard to the page to which the departure was taken.

Alternatively, the presenter may wish to be certain that all participants have a view of a particular page at one or more points in the presentation. For this reason, synchronization of the image provided to the user with the page changes controlled by the presented is provided in some e-meeting tools by sending the presenter's image change commands to the participants as part of the presentation. However, while page changes made by the presenter may be transmitted as part of the virtual meeting, it is not practical to track the potential departures of all users and to transmit individualized commands when the presenter changes pages or to transmit the actual pages as the presenter changes pages since either procedure would greatly increase processing at the presenter's terminal and transmission overhead, particularly for current page transmission which cannot be done in real time and variation in transmission delays may also be a source of similar user confusion. All of the above distractions and sources of confusion are exacerbated when the user participates from a regular business terminal which may also present pop-up chat items, telephone messages (e.g. voice over internet protocol), e-mail arrival announcements and the like may occur. At the current state of the art, no solution to these problems exist which are consistent with a user's freedom to browse the presenter's pages.

SUMMARY OF THE INVENTION

It is therefore an object of the present invention to provide a system and method compatible with other virtual meeting presentation tools for synchronization of changes of displayed pages of both the presenter and the user/participant in a virtual meeting environment while allowing the user/participant full freedom to depart from the currently displayed page to another page and to return in a simple manner to the presenter's current page even though that page may have changed from the current page when the departure was made and without significant increase in transmission overhead.

In order to accomplish these and other objects of the invention, a method and apparatus providing a computer program for synchronization of pages of a presentation between a presentation computer and a user/participant computer while allowing browsing of pages by a user/participant are provided, performing steps of transmitting pages corresponding to the presentation from the presentation computer to the user/participant computer, browsing pages of the presentation at the user/participant computer, detecting a page change at the presentation computer, storing an identifier of a page responsive to the page change command, transmitting a command to said user/participant computer containing the identifier of a page resulting from performance of the page change command, and displaying a page corresponding to the identifier in response to the command transmitted in the transmitting step.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
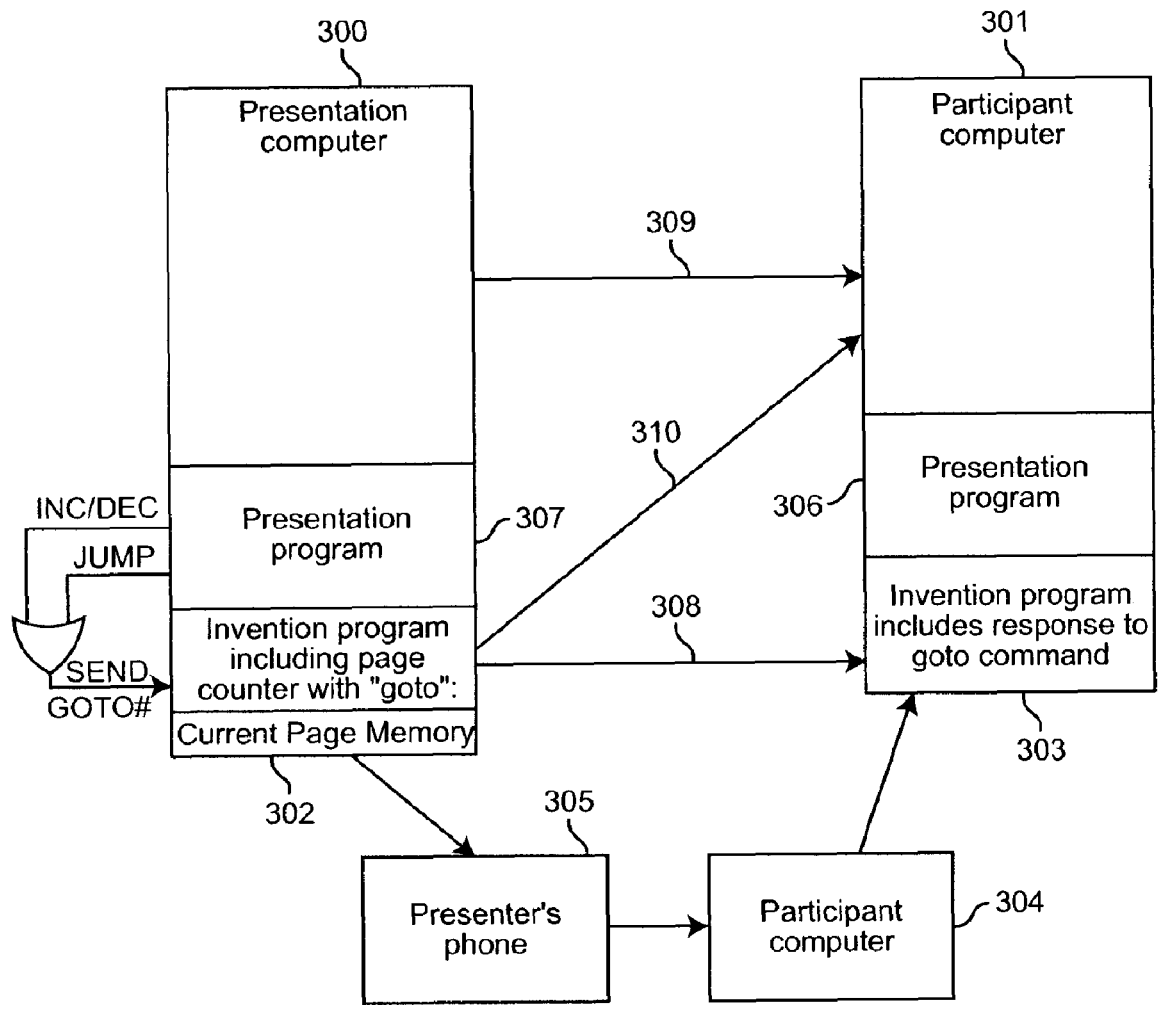
FIG. 1 is a high-level block diagram of the virtual meeting system in accordance with the invention, and FIGS. 2A and 2B form a flow chart illustrating the operation of a preferred embodiment of the invention.

Referring now to the drawings, and more particularly to FIG. 1, there is shown a high-level schematic block diagram of the invention. Those skilled in the art will also appreciate that FIG. 1 can also be understood as a data flow diagram of data and control signals through a preferred embodiment of the system. For clarity, only a single user/participant terminal or computer 301 is shown and the invention is certainly applicable to a single user/participant communication environment. However, it is to be understood that an arbitrarily large number of such terminals or computers may be and normally would be employed in the preferred environment of a virtual meeting or online presentation and the communication from the presenter terminal or computer 300 would then resemble a broadcast of the presentation.

As can be readily appreciated from the architecture of the system depicted in FIG. 1, the invention, in its preferred form, is basically an enhancement of the presentation program 307, 306 for each of the presenter and the user, respectively. The respective and complementary virtual meeting presentation programs or tools 307, 306 are resident on and run on a presentation computer 301 and a participant computer 300, respectively. The presenter computer controls transmission to the participant computer(s) over a network in any suitable manner and using any protocol; the details of which are unimportant to the practice of the invention. It should be understood, however, that such a presentation program 307 allows control of some few functions of the participant computer by the presenter, such as indicating a change of pages of the display or use of a pointing device. Further, the presentation program preferably transmits all of the pages for the presentation upon a user/participant joining the virtual meeting or online presentation and that the complementary presentation programs 306, 307 provide an audio channel for the presentation. Additionally, known presentation programs also provide for the transmission and reception of control signals for providing synchronization between traversal of pages at the presenter terminal (e.g. with forward or backward increments or "go to" commands) and at the user/participant terminal although user/participant browsing of the presentation pages may be precluded thereby, as alluded to above, or available only to the exclusion of such synchronization in known systems.

It is also assumed, for purposes of this discussion of the preferred embodiment of the invention, that a window is provided for display of the pages of the presentation and that corresponding pages for note-taking, concurrent applications and the like may be provided in a separate window separate from or only partially overlaid by the window provided for the presentation. Nevertheless, in known systems where synchronization of pages with the presenter terminal and the capability for browsing are mutually exclusive, the user/participant must shift between applications to change pages (e.g. to seek the current page of the presentation if browsing is provided or to make notes for or to view a different page in another copy of the presentation pages if synchronization is provided). It is this inconvenience and source of confusion in regard to the presentation that the invention principally seeks to avoid while maintaining compatibility with existing presentation programs.

To achieve this meritorious effect, the invention provides for generation and communication of additional control commands from the presenter's terminal 300 to the user/participant terminal 301 when the presenter changes the displayed page. More specifically, the page navigation enhancement 302 in accordance with the invention at the presenter terminal 300 tracks the presenter's traversal of the presentation pages in forward/backward increments or "go to" jumps (which are conventionally transmitted to the user/participant terminal in the same increment or jump form used by the presenter) and upon the occurrence of either (as schematically illustrated by an OR gate in FIG. 1), sends a "go to" command corresponding to the newly specified page to the user/presenter terminal. Preferably, the page navigation program 303 at the user/participant terminal allows the user/participant to accept or reject or block this command, when received. Thus, if the user/participant permits the command to be accepted, any page change specified in any form (e.g. increment or jump) at the presenter terminal can cause a jump (even if only by a forward or backward increment) to the current page. If the command is blocked at the user/participant terminal, the current page will be displayed, omitting display of any pages which may have been specified by the presenter while the command was blocked, at the first specified page change after such commands are unblocked or immediately, using the last "go to" command transmitted by the presenter computer 300. Thus the invention supports a suspension of synchronization of pages and return to synchronization of pages under control of the user/participant while allowing browsing of presentation pages while page synchronization can also be forced from the presenter computer. Shifting between applications is only necessary to switch between these two modes of operation. In general, it is believed that suppressing or blocking the command by the user/participant will be relatively rare since the user/participant will generally wish to at least briefly view each new page at the time it is presented while the user/participant can return to a previously viewed page easily by browsing since the user/participant will know the page desired but cannot anticipate or know the page that the presenter has specified when a page change occurs at the presenter terminal 300.

This additional "go to" command can be communicated in a number of ways consistent with the invention. The choice of how the command is communicated is largely a matter of the availability or relative convenience of particular communication links in connection with existing presentation programs 306, 307. That is, the virtual meeting will necessarily include an audio link of some type such as a telephone line operating as a conference call or a voice over internet protocol (VoIP) channel handled through the network and the commands in accordance with the invention can be sent over that link, as well, if adequate bandwidth is available.

For example, the command could be communicated over the same network link used for the communication of the presentation by placing the command in packets or portions thereof corresponding to the audio link used for the presentation but using comparatively unused portions of the audio spectrum as depicted by arrow 308 (although it should be understood that such a communication link is more properly regarded as a communication between terminals 300 and 301, depicted by the arrow 309 in FIG. 1; arrow 308 being provided to indicate that the command is in addition to the data normally communicated in a conventional presentation). However, this expedient may be unnecessarily complicated to provide and/or suitable bandwidth in the presentation communication link may not be available or reliably so. Moreover, such communication increases network traffic for the presentation.

Alternatively, a communication link over the network between terminals 300, 301 but independent of the presentation communication (e.g. directly from the page navigation arrangement 302 directly to user/participant terminal 301 could be used as depicted at 310. This communication could be accomplished through any type of network communication such as an e-mail type of signal.

However, to maximize compatibility with existing presentation arrangements, it is preferred to provide an additional communication link to carry such commands. Provision of a separate link as will be described below completely avoids any need for modification of the presentation arrangement or the communications involved therein. Moreover, the invention provides for automatic selection of any available communication link.

To avoid any modification of the presentation system while communicating the control signals in accordance with the invention over the network, it is possible to implement the invention by using so-called voice over internet protocol (VoIP) techniques which have been recently developed and are increasing in commercial acceptance. Essentially, VoIP provides for sampling the audio output of a telephone set or any other equipment carrying an audio signal, encoding and packetizing that signal and transmitting it in accordance with any standard internet or network protocol to the intended destination where the message is reassembled, decode and played out to the user. In short, VoIP transparently provides a user with all normal telephone functions using the Internet or any other network as the communication medium.

However, in theory, input to a VoIP link need not originate from or be transmitted to a telephone set and may be any type of signal that could be transmitted over a telephone line. Thus, for purposes of the invention, the call may be initiated and signals to be communicated generated directly and using an appropriate protocol as signals representing an audio signal but which is not actually generated by the presentation navigation arrangement 302. Thus the VoIP link 311 between the presentation arrangements of the presenter and the user participant 302, 303 thus provides an extremely convenient additional communication link which is both independent of the presentation arrangement 306, 307 and potentially entirely transparent to the user/participant if a VoIP link is provided on both the presentation terminal 300 and the user/participant terminal 301.

Alternatively, a telephone link over existing telephone infrastructure separate from that used for the virtual meeting can be used to provide an additional communication link for communicating the additional commands in accordance with the invention as depicted at 312 of FIG. 1. In this case, it is not necessary for VoIP capabilities to exist on the presentation and user/participant terminals as noted above. Further, if, for example, VoIP is available on the presentation terminal but on less than all user/participant terminals, both VoIP and telephone infrastructure links may be used simultaneously as will be discussed below. In any case, it should be appreciated that use of telephone infrastructure to provide an additional communication link in accordance with the invention allows the invention to be implemented most flexibly in existing computers and terminals since no modification of any existing application resident thereon is required and the only hardware requirement is a modem suitable for connection to telephone lines which is almost ubiquitous on computers currently in use and, of course, telephone sets 304, 305 for the user/participant and the presenter, respectively. It may also be convenient in this regard but unimportant to the successful practice of the invention to integrate computers/terminals 300, 301 with telephone sets 304, 305 or other telephone infrastructure using a wireless communication arrangement such as Bluetooth™ or the like.

Figure 2A:
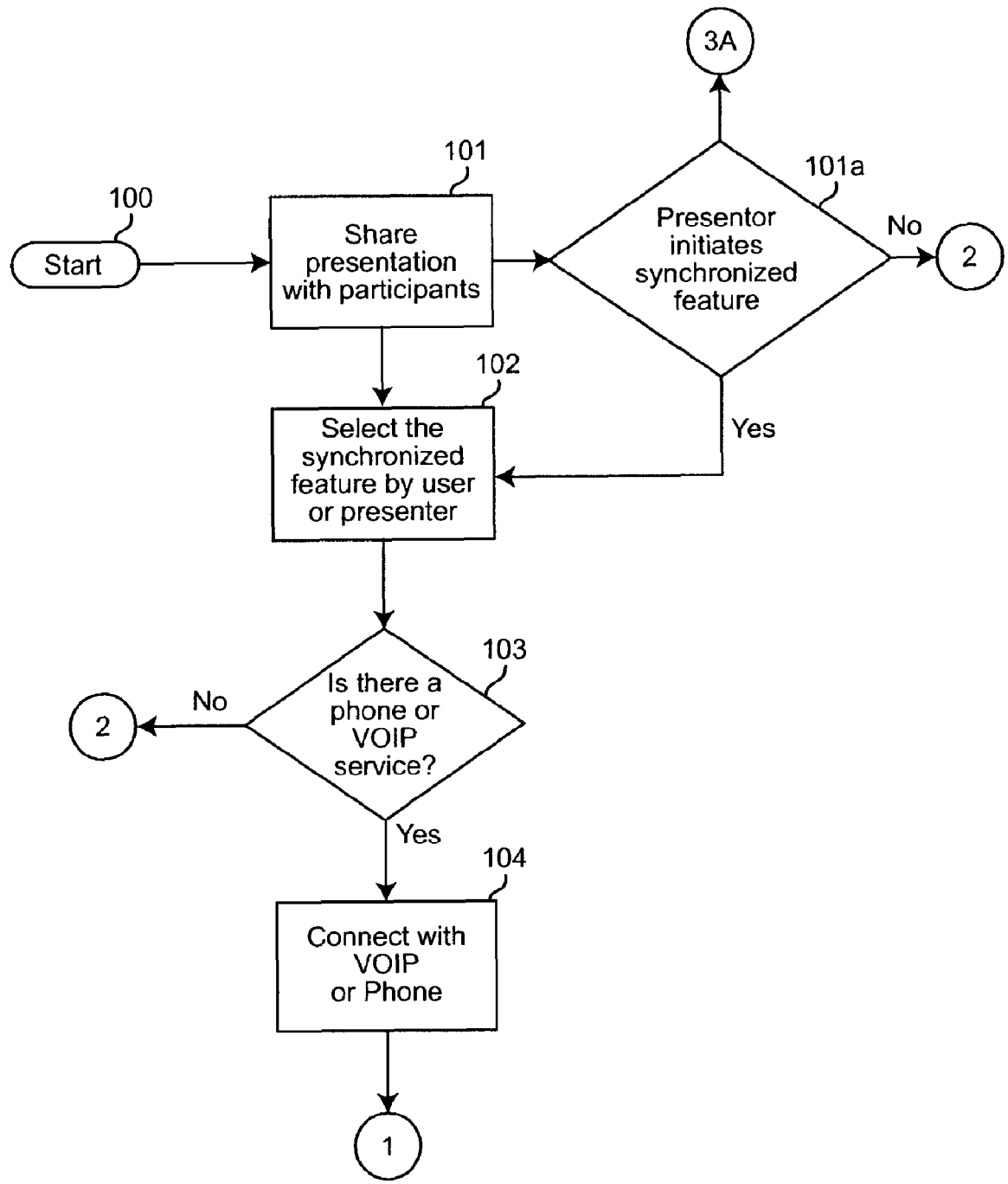
Figure 2B:
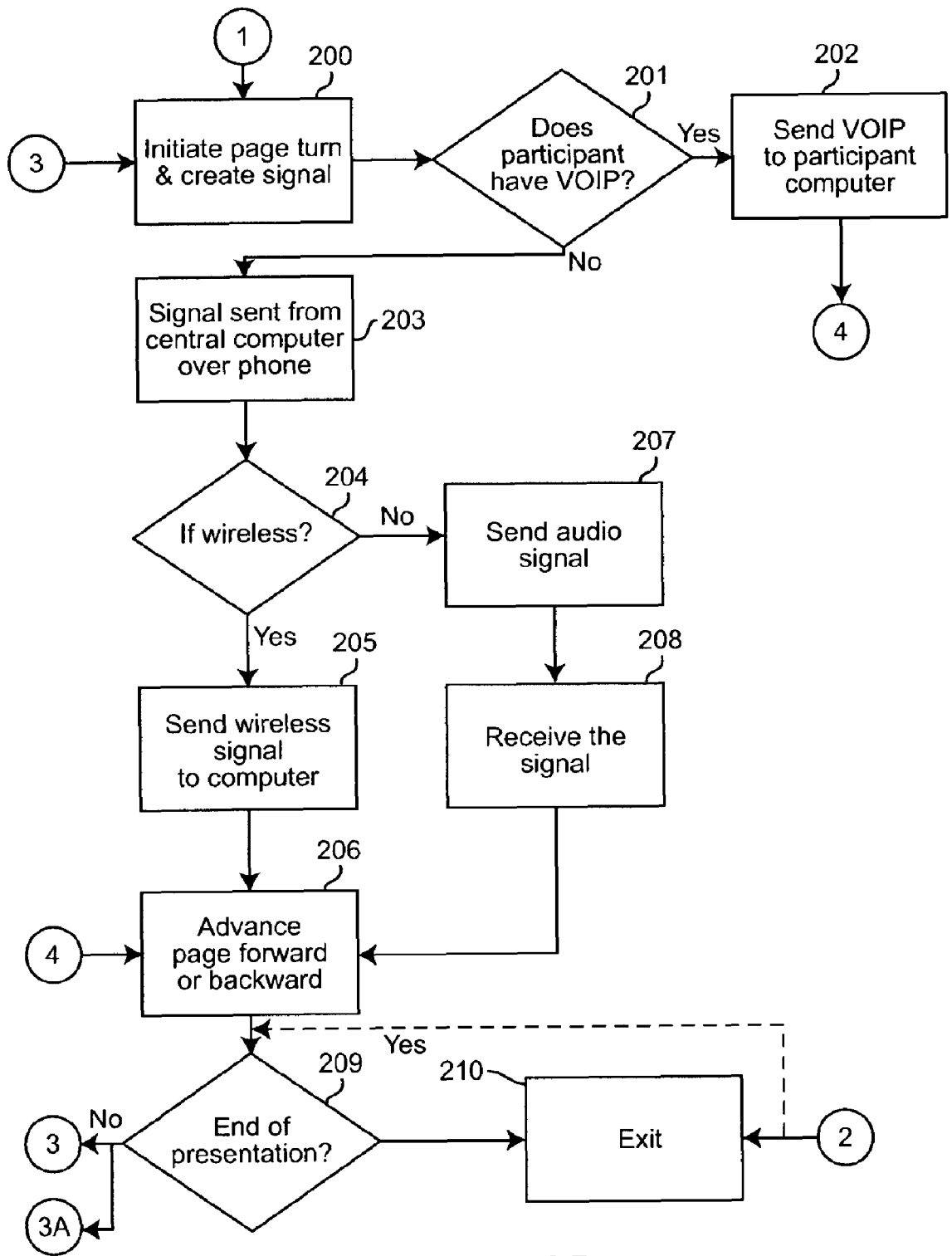

Referring now to FIGS. 2A and 2B the operation of a preferred embodiment of the invention will now be discussed.

It should be understood and appreciated that the user/participant can browse the presentation pages freely throughout the operation of the invention as will be described below and the operation of the invention will cause display of the current page whenever the presenter specifies a page change, after which browsing may be resumed either manually or automatically. The taking of notes or other activity of the user/participant using another application and displayed in another window is unaffected by either the page change or the resumption of browsing since the invention is embodied as an enhancement of the presentation arrangement, itself.

The process begins (100) with the starting of the program presentation programs 306, 307 at the respective user/participant terminal(s) and the presentation terminal, respectively, and the pages to be displayed are downloaded to or shared with (101) the participants. It is considered desirable to initially provide the pages so that the user/participant may browse them at any time and to reduce the network data traffic during the presentation. At the presentation computer, the presenter may select or deselect the synchronization feature as shown at 101*a*. This control for selection or deselection by the presenter may be exercised at any time and step 101*a* should be understood as an alternative first step of the process illustrated in FIG. 2A if step 101 has been previously performed for the presentation session. That is, if the presenter deselects synchronization as provided by the invention the process exits or enters a wait state until the end of the presentation before exiting, as depicted by a dashed line from Cardinal number 2 in FIG. 2B but the process may be restarted at any time. For example, as depicted by Cardinal number 3A which is depicted in parallel with cardinal number 3 in FIG. 2B, after a page change has been indicated (and performed) and it is determined at 209 that the presentation is continuing, the invention essentially provides a wait state which is terminated by a change of selection or deselection of synchronization in accordance with the invention. Thus, if such a change occurs prior to the next page change command, the invention performs the operations of FIG. 2A to ensure that a communication link is provided for the "go to" commands provided by the invention, if needed. The user/participant can then select or deselect the synchronization function provided by the invention, as illustrated at 102. (The two paths between operations 101 and 102 should be understood to represent a complementary difference in the implementations of the invention 302 or 303 in regard to the presenter and the user/participant, respectively.) It is also desirable to provide for the presenter to be provided with control of whether or not synchronization is to be provided at least to the extent of providing an additional command which can be sent in the same manner as a "go to" command which will cause the synchronization feature to be selected at the user/participant terminal in order to allow the presenter to insure that a particular page is simultaneously presented to each user/participant, if desired, regardless of the selection/deselection made by the user/participant. Operation 102 should also be understood as illustrating this feature of forcing selection of synchronization at the user/participant computer 301 from the presentation computer 300.

The invention then determines (103) the available communication channel to be used. As indicated above, it may preferred to use a communication channel which is separate and distinct from that used for the presentation. The invention checks if VoIP or telephone sets or infrastructure are available whether or not it is to be used as the audio channel of the presentation. If neither is available (which would seldom be the case), the presentation cannot be conducted and the process exits. If neither is available beyond that which is to be used for the audio channel of the presentation, the presenter may be given an option to use communications channels provided for the presentation. If the presenter does not wish to do so or if there is no provision for doing so in the presentation program, no communication channel can be provided to support operation of the invention and the process also exits 210 (FIG. 2B). If VoIP or telephone infrastructure is available, the invention then makes a connection therewith, preferably using VoIP, if available and then using the telephone infrastructure as a default. If this communication link fails during use of the invention, which can be detected at any point in the process which will be described below in connection with FIG. 2B, possibly by monitoring returned transmission confirmation messages or the like, the processes should branch back to step 104 to re-establish a connection and retransmit the most recent "go to" command. At this point, computers 300, 301 are connected and communicating, the presentation arrangement or program is running and the presentation may proceed.

It is assumed for purposes of the following discussion in connection with FIG. 2B that the presenter and user/participant have both selected to use the synchronization feature provided by the invention. It should be understood in this regard that the invention can be disabled or enabled at any time and at any point in the presentation as described above. The process described above provides for unconditional local storage of the pages at the user/participant computer or terminal initially as an incident of joining the presentation as illustrated at 101 of FIG. 2A which will be maintained by the presentation arrangement for at least the duration of the presentation. As will be discussed below, if the synchronization is deselected by the presenter, the deselection is performed and the communication link freed during the interval between page change commands which will be the majority of the time of the presentation. This process also serves to poll the communication links and provide reconnection if necessary, as alluded to above.

The operation of the invention to generate page synchronization commands begins with a page turn or change action at the will of the presenter whereupon the presentation computer running the presentation program or other presentation arrangement will generate a signal, as illustrated at 200, (as either an increment/decrement command or a "go to" command) to retrieve and display the desired page. It is then determined for each user/participant if a VoIP link is available at 201. If so, a page number corresponding to the new page is retrieved and a "go to" command is placed in the desired protocol and sent 202 directly to the user/participant computer(s)/terminal(s). If not, a signal containing a "go to" command and the new current page number is sent 203 from the presentation structure over a telephone set or other telephone system infrastructure.

It should be noted that different types of signals are appropriate to wired or wireless telephone devices and, if a wireless telephone access to the telephone system infrastructure is provided, as determined at 204, a signal appropriate to the receiver (e.g. a digital equivalent of an audio tone may be directly generated and transmitted, as illustrated at 205. If access is by a wired telephone link or telephone handset or the like, an audio tone is generated and sent, as illustrated at 207 which is then received at the user/participant computer 301 and detected and decoded (to recover the command and new page identifier) as illustrated at 208 and an appropriate local command signal developed, if needed. In either case, a "go to [current page]" command 206 is executed at the user/participant computer 301 to advance the page forward or backward as a jump even if to the immediately next or previous page in the linear page sequence.

It is then determined if the presentation has ended and if not, the process loops back to 200 and/or 102 if a selection/deselection change is detected and the process repeated upon action by the presenter to indicate a desired page change. If the presentation ends or has ended, the process exits.

In view of the foregoing, it is seen that the invention provides for synchronization of display of pages of a presentation as pages are changed by a presenter while allowing full freedom to a user/participant to browse other pages of the presentation with little, if any modification of the presentation arrangement and using substantially ubiquitous hardware; a facility which has not heretofore been available. The invention can be deselected at the will of the user/participant at any time during a presentation and, preferably and as a perfecting feature of the invention, the presenter may force selection at the user/participant computer. Network traffic incident to the presentation and response time for new pages or browsing are reduced by initial transmission and storage of the presentation pages.

While the invention has been described in terms of a single preferred embodiment, those skilled in the art will recognize that the invention can be practiced with modification within the spirit and scope of the appended claims.

What is claimed is:

1. A method of synchronization of pages of a presentation between a presentation computer and a user/participant computer while simultaneously allowing browsing of pages by a user/participant, said presentation being conducted over a presentation communication link, said method comprising steps of transmitting a plurality of pages corresponding to said presentation from said presentation computer to said user/participant computer over said presentation communication link, browsing said plurality of pages corresponding to said presentation at said user/participant computer, detecting a page change at said presentation computer, tracking said page change at said presentation computer to determine a current page, said page having a corresponding identifier, storing said identifier of a page responsive to said tracking step, determining an available telephone infrastructure link between said presentation computer and said user/participant computer separate from said presentation communication link, transmitting a command to said user/participant computer containing said identifier of a page resulting from performance of said page change command over a telephone infrastructure link, said telephone infrastructure link being integrated with at least one of said presentation computer and said user/participant computer but separate from said presentation communication link, and displaying a page corresponding to said identifier in response to said command transmitted in said transmitting step.

2. The method as recited in claim 1 wherein said telephone infrastructure includes a wireless link.

3. The method as recited in claim 1 wherein a wireless communication arrangement integrates said telephone infrastructure with one of said presentation computer and said user/participant computer.

4. The method as recited in claim 1, including a further step of selecting or deselecting said displaying step.

5. The method as recited in claim 4, including a further step of transmitting a command from said presentation computer to force selection of said displaying step at said user/participant computer.

6. The method as recited in claim 1, including a further step of
   selecting a communication link between said presentation computer and said user/participant computer for performing said step of transmitting a command.

7. The method as recited in claim 6, including a further step of
   generating a signal representing said command in response to said step of selecting a communication link.

8. The method as recited in claim 7, wherein said communication link is an audio link and said signal is an audio signal.

9. The method as recited in claim 7, wherein said communication link is a digital link and said signal is a digital signal.

10. The method as recited in claim 9, wherein said digital signal represents an audio signal.

\* \* \* \* \*